United States Patent
Line et al.

(10) Patent No.: US 11,104,252 B2
(45) Date of Patent: Aug. 31, 2021

(54) CUSHION SUPPORT ASSEMBLY FOR VEHICLE SEATING ASSEMBLY

(71) Applicant: Ford Global Technologies, LLC, Dearborn, MI (US)

(72) Inventors: Johnathan Andrew Line, Northville, MI (US); Spencer Hoernke, Dundas (CA); Marcos Silva Kondrad, Macomb Township, MI (US); Sean West, Monroe, MI (US); Benjamin Yilma, Canton, MI (US); Edward Joseph DeSmet, Canton, MI (US); S. M. Akbar Berry, Windsor (CA); Rodney Charles Brinker, Eastpointe, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 188 days.

(21) Appl. No.: 16/517,169

(22) Filed: Jul. 19, 2019

(65) Prior Publication Data
US 2021/0016693 A1    Jan. 21, 2021

(51) Int. Cl.
| B60N 2/427 | (2006.01) |
| B60N 2/68 | (2006.01) |
| B60R 21/207 | (2006.01) |
| B60R 21/264 | (2006.01) |
| B60R 21/231 | (2011.01) |
| B60N 2/14 | (2006.01) |

(Continued)

(52) U.S. Cl.
CPC ....... *B60N 2/42763* (2013.01); *B60N 2/4279* (2013.01); *B60N 2/686* (2013.01); *B60R 21/207* (2013.01); *B60R 21/264* (2013.01)

(58) Field of Classification Search
CPC ............ B60N 2/42718; B60N 2/42754; B60N 2/42763; B60N 2/42772; B60N 2/4279; B60N 2/686; B60R 21/207; B60R 21/264; B60R 2021/23146
See application file for complete search history.

(56) References Cited

U.S. PATENT DOCUMENTS

| 6,648,409 B1 | 11/2003 | Laporte |
| 6,746,077 B2 | 6/2004 | Klukowski |

(Continued)

FOREIGN PATENT DOCUMENTS

| DE | 10011819 A1 * | 11/2000 | ......... B60N 2/42718 |
| DE | 19943595 A1 * | 3/2001 | ......... B60N 2/42718 |
| DE | 102008063357 A1 | 7/2010 | |

OTHER PUBLICATIONS

Description Translation for DE 19943595 (Year: 2001).*

*Primary Examiner* — Ruth Ilan
*Assistant Examiner* — Daniel M. Keck
(74) *Attorney, Agent, or Firm* — David Coppiellie; Price Heneveld LLP

(57) ABSTRACT

A vehicle seating assembly having a housing assembly coupled to a seat frame with a transverse member. A cushion pan extends between the transverse member and a cross bar. A cushion nose extends between the transverse member and a front portion of the housing assembly. A gas-generating device is deployable in response to a sudden vehicle deceleration to exert a force on the cushion nose to rotate the cushion nose about an axis defined by a transverse member from a first position to a second position.

15 Claims, 12 Drawing Sheets

(51) Int. Cl.
  *B60N 2/06* (2006.01)
  *B60N 2/62* (2006.01)

(56) References Cited

U.S. PATENT DOCUMENTS

| | | |
|---|---|---|
| 6,908,149 B1 | 6/2005 | Yamaguchi et al. |
| 9,457,751 B1* | 10/2016 | Stancato ................. B60R 21/02 |
| 2006/0061167 A1 | 3/2006 | Adragna et al. |
| 2016/0016492 A1* | 1/2016 | Subramanian ..... B60N 2/42763 |
| | | 297/216.1 |
| 2021/0078469 A1* | 3/2021 | Humer ................. B60N 2/0232 |

* cited by examiner

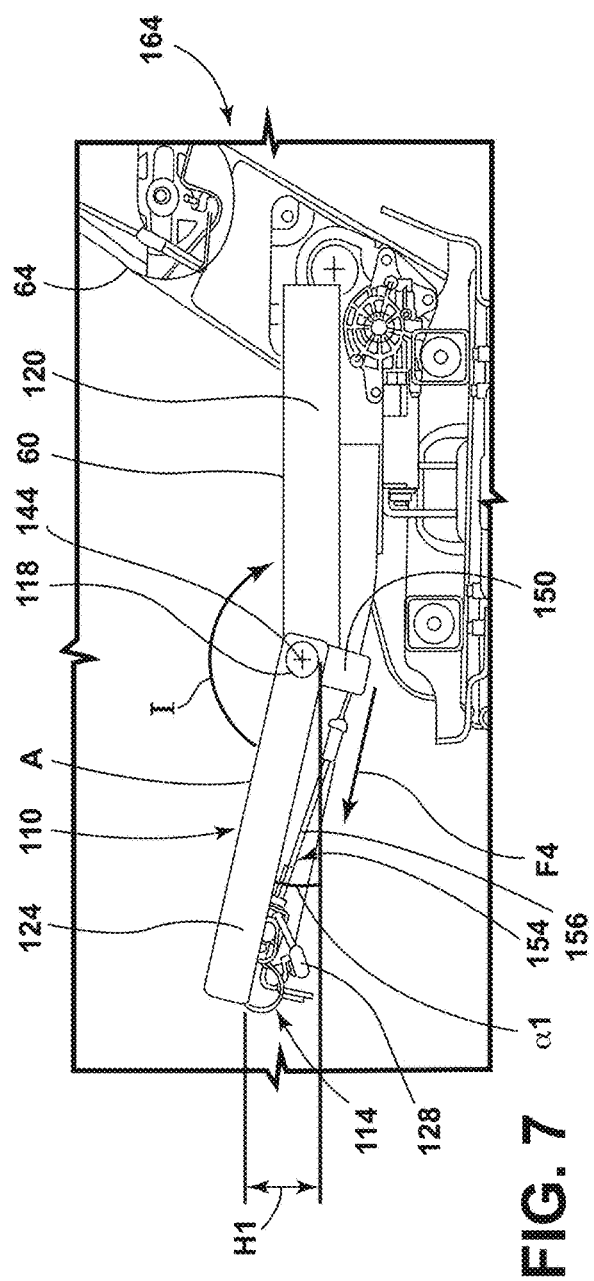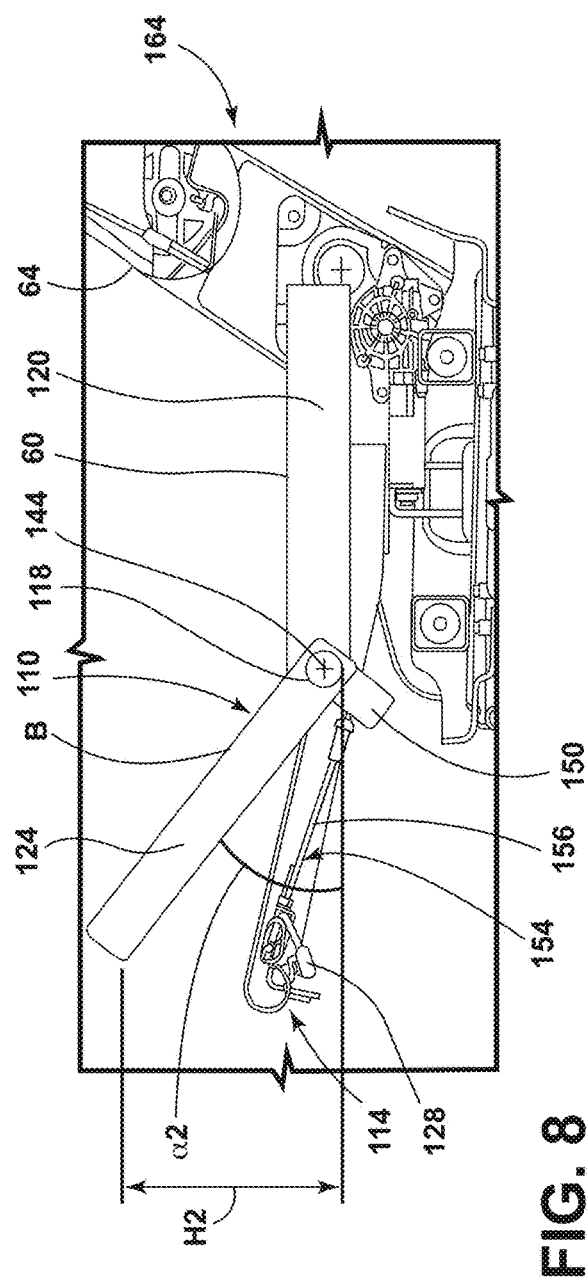

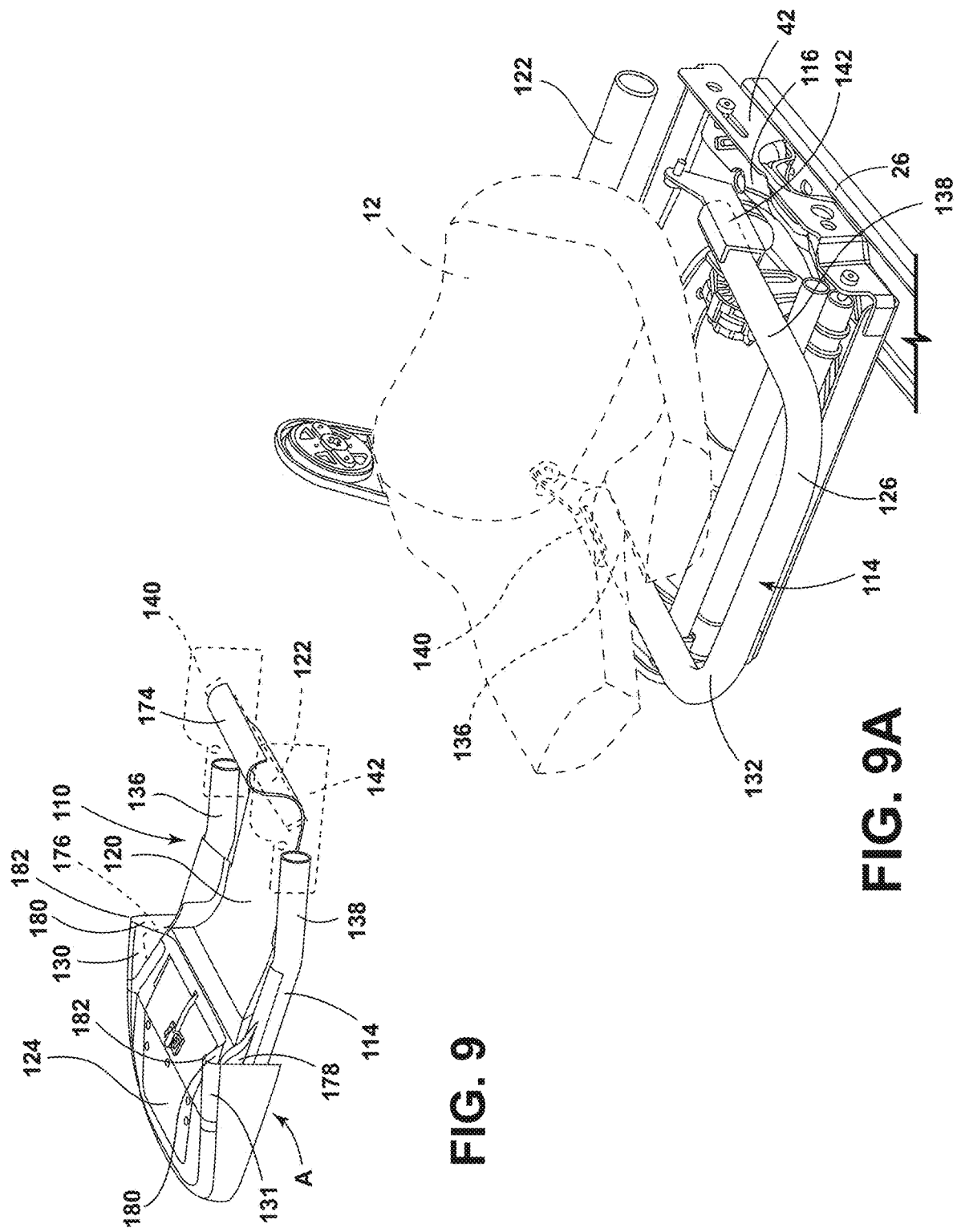

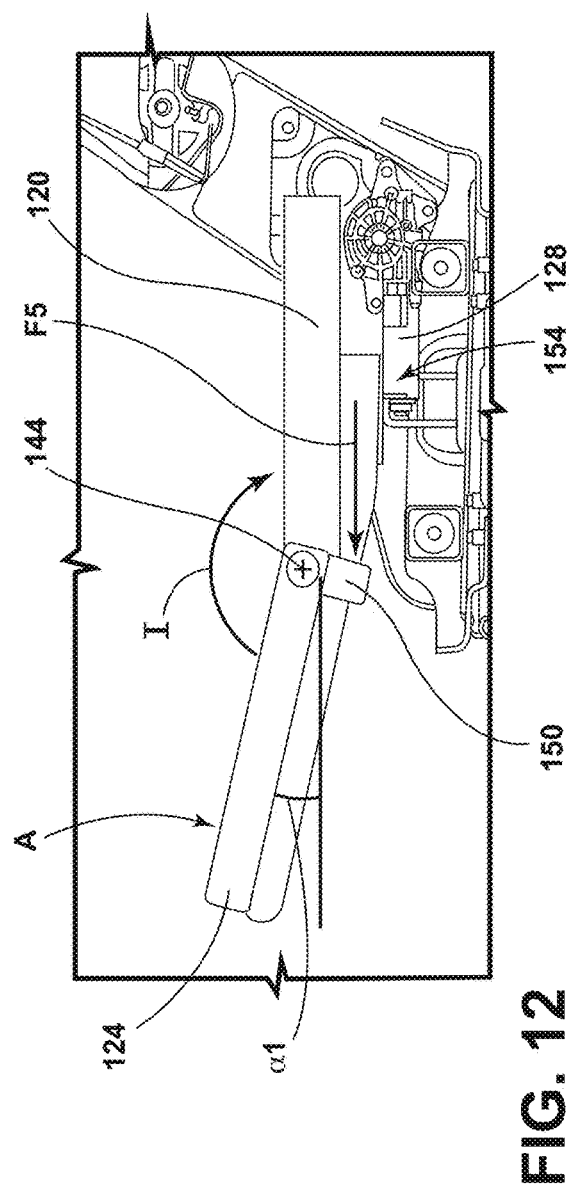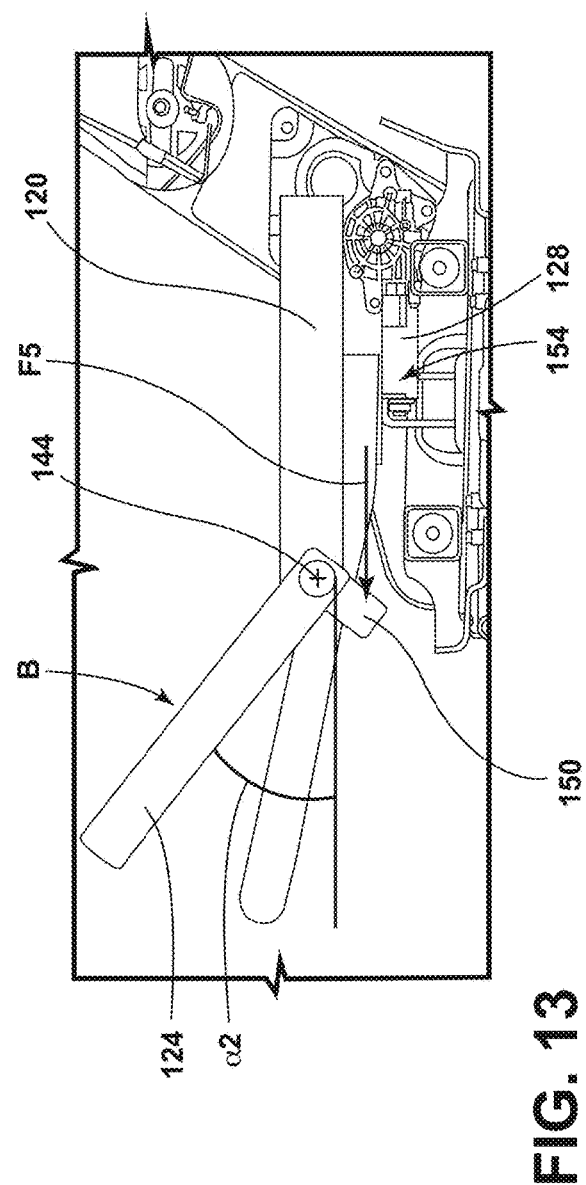

CUSHION SUPPORT ASSEMBLY FOR VEHICLE SEATING ASSEMBLY

FIELD OF THE INVENTION

The present invention generally relates to a vehicle seating assembly, and more specifically to a vehicle seating assembly designed to manage the position of a seating assembly occupant.

BACKGROUND OF THE INVENTION

A vehicle seating assembly may have features that manage the position of an occupant of a vehicle seat.

SUMMARY OF THE INVENTION

According to one aspect of the present invention, a vehicle seating assembly has a housing assembly coupled to a seat frame. The housing assembly includes a transverse member. A cushion pan extends between the transverse member and a cross bar. A cushion nose extends between the transverse member and a front portion of the housing assembly. A gas-generating device is deployable in response to a sudden vehicle deceleration to exert a force on the cushion nose to rotate the cushion nose about an axis defined by a transverse member from a first position to a second position.

Embodiments of the first aspect of the invention can include any one or a combination of the following features:
- the first position includes a design position, and the second position includes a fully deployed position;
- the cushion pan includes a lip for coupling the cushion pan to the cross bar;
- the housing assembly includes first and second elongated portions disposed on first and second sides of the cushion pan;
- the housing assembly includes a u-shaped member defined by the first and second elongated portions and the front portion of the housing assembly;
- first and second brackets for securing the u-shaped member to the cross bar;
- the gas-generating device is disposed below the cushion nose and is operably coupled to a cable assembly having a first end secured to the housing assembly below the cushion nose and a second end secured to the cushion nose;
- the force is a tensile force;
- the force comprises a compressive force exerted on the cushion nose to move the cushion nose from a design position to a fully deployed position;
- the gas-generating device is disposed below the cushion pan and exerts a compressive force on the cushion nose to rotate the cushion nose about an axis defined by the transverse member;
- the gas-generating device is disposed in a cylinder having a telescoping member;
- opposing first and second scissor lifts are disposed between the cushion nose and the housing assembly;
- a gas-generating device is disposed between the first and second scissor lifts, wherein the first and second scissor lifts each move from a stored position to an extended position to move the cushion nose from a design position to a fully deployed positon; and
- the cushion nose is disposed at a first angle relative to the cushion pan in the design position, and the cushion nose is disposed at a second angle relative to the cushion pan in the fully deployed position, wherein the first angle is less than the second angle.

According to another aspect of the present invention, a vehicle seating assembly includes a housing assembly coupled to a seat frame and a cushion support assembly disposed in the housing assembly with a cushion nose rotatably coupled to a cushion pan. A cushion is disposed above the cushion support assembly and provides a seat surface. A pyrotechnic device is configured to receive a signal from a restraint control module to activate in response to the signal to generate a force that rotates the cushion nose about an axis defined by a transverse member of the cushion support assembly from a design position to a fully deployed position.

- the transverse member comprises an extension tab, wherein the pyrotechnic device is coupled to the extension tab, and activation of the pyrotechnic device exerts a force on the extension tab to move the cushion nose from a design position to a fully deployed position;
- the cushion nose includes first and second bolsters;
- the housing assembly includes first and second protrusions disposed on first and second elongated portions of the housing assembly, wherein the cushion nose is in the fully deployed position, and the first and second protrusions engage the first and second bolsters of the cushion nose to limit movement of the cushion nose; and
- a front edge of the cushion nose is disposed at a first height in the design position and a second height in the fully deployed position.

According to another aspect of the present invention, a seating assembly includes a cushion support assembly including a cushion nose rotatable from a design position to a fully deployed position. A housing assembly is coupled to a seat frame and retains the cushion support assembly. A pyrotechnic device is disposed below the cushion support assembly and is operably coupled to the cushion nose, wherein the pyrotechnic device activates in response to a detection of a sudden vehicle deceleration to exert a force on the cushion nose to move the cushion nose from the design position to the fully deployed position.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 7 is a side elevational view of a seating assembly with a cushion support assembly in the design position, according to an example;

FIG. 8 is a side elevational view of the seating assembly with a cushion support assembly of FIG. 7 in a fully deployed position, according to an example;

FIG. 9 is a side perspective view of a housing assembly and a cushion support assembly in the design position, according to an example;

FIG. 9A is a side perspective view of a housing assembly coupled with a seat frame;

FIG. 12 is a side elevational view of a seating assembly with a cushion support assembly in the design positon, according to an example;

FIG. 13 is a side elevational view of a seating assembly with a cushion support assembly of FIG. 12 in a fully deployed position, according to an example;

DETAILED DESCRIPTION

Figure 1:
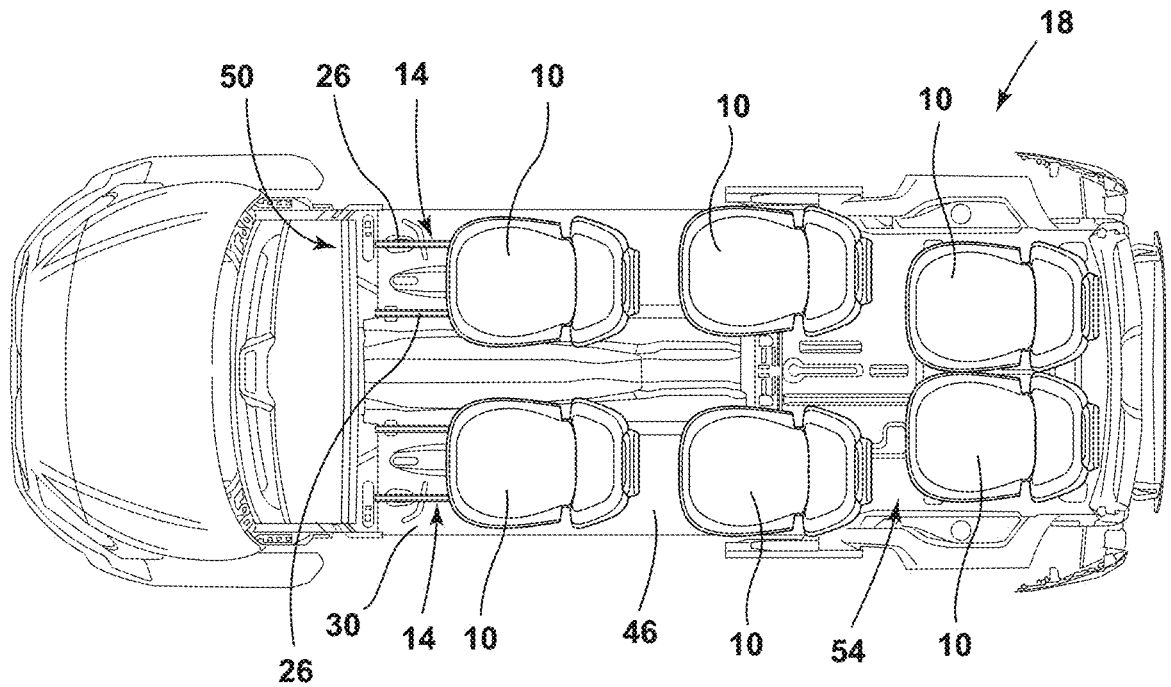
FIG. 1 is a top plan view of a portion of a vehicle having a plurality of seating assemblies in a first configuration.

For purposes of description herein, the terms "upper," "lower," "right," "left," "rear," "front," "vertical," "horizontal," and derivatives thereof shall relate to the concepts as oriented in vehicle 18 of FIG. 1. However, it is to be understood that the concepts may assume various alternative orientations, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to the seating assembly 10 described below and shown in the attached figures, a seating assembly 10 may be described from the vantage point of an occupant 12 seated in the seating assembly 10. The side of a seating assembly 10 disposed on a right side of a seated occupant 12 may be referred to as a right side or a first side of the seating assembly 10. The side of a seating assembly 10 disposed on a left side of a seated occupant 12 may be referred to as a left side or a second side of the seating assembly 10.

Figure 2:
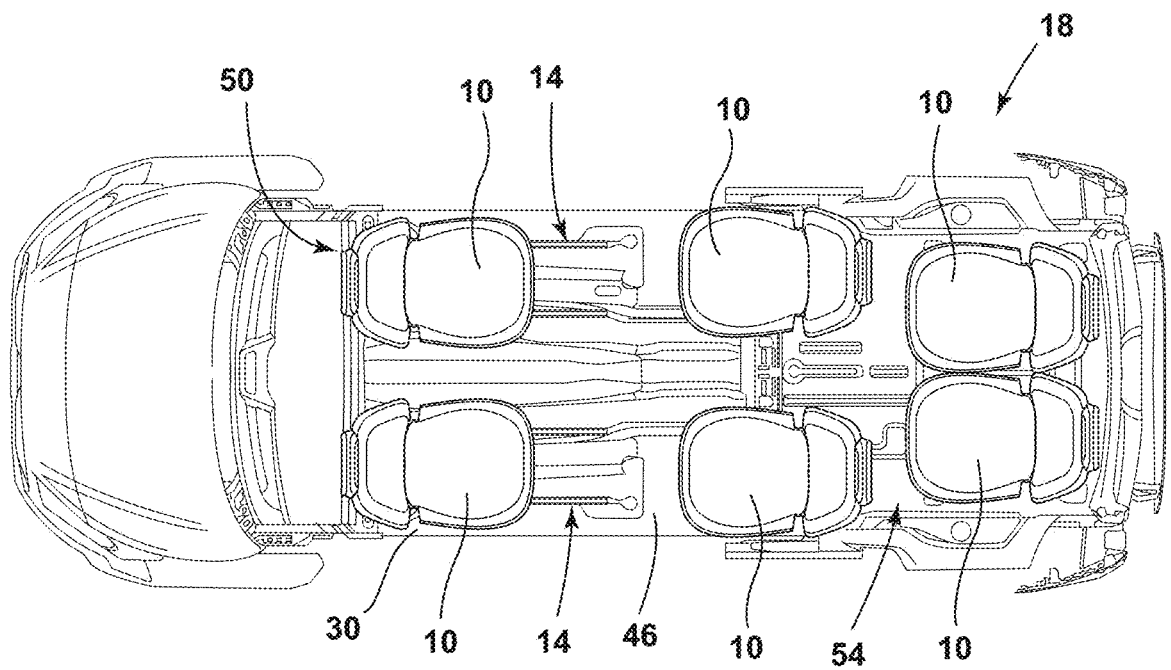
FIG. 2 is a top plan view of a portion of a vehicle having a plurality of seating assemblies in a second configuration.
Figure 3:
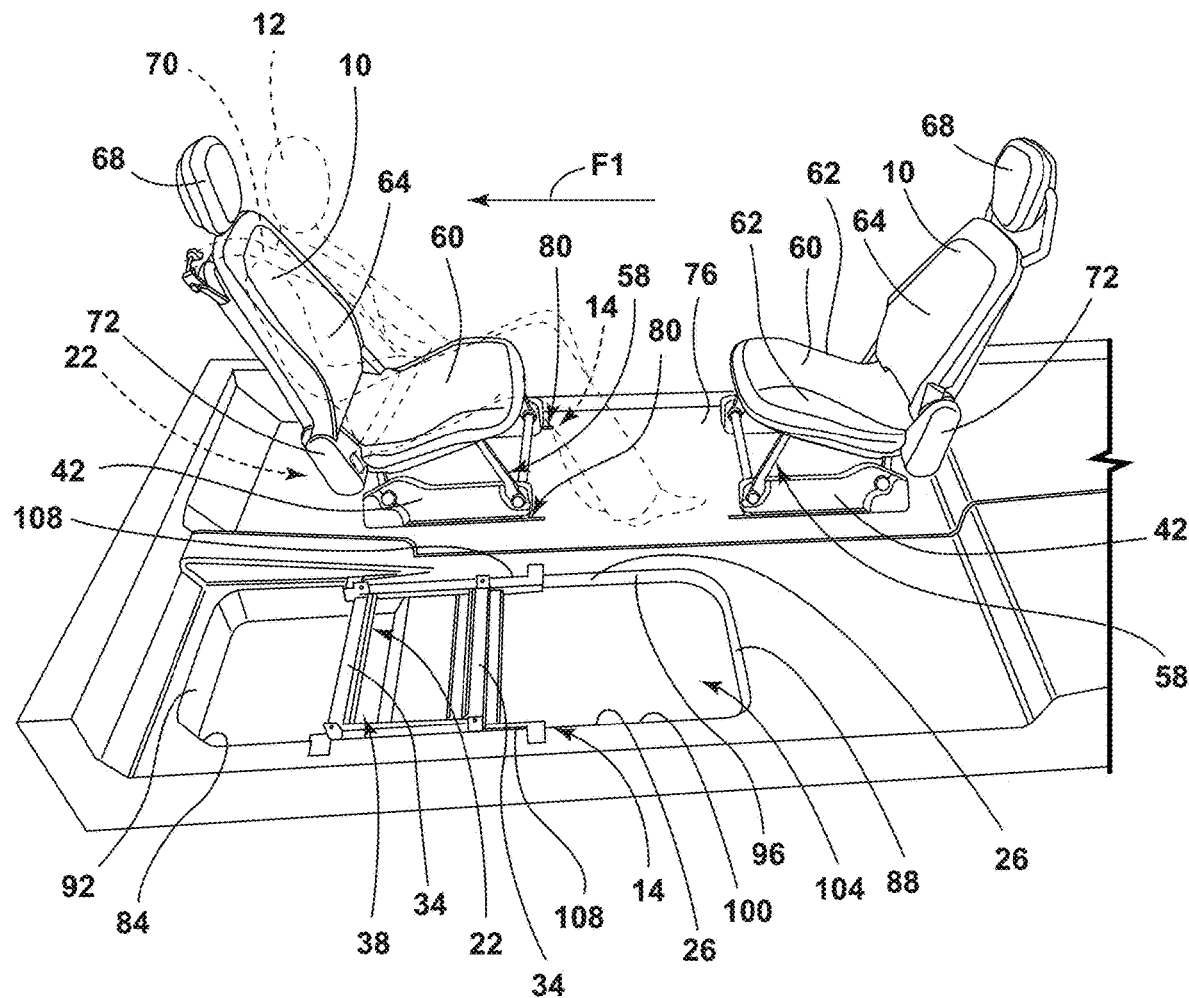
FIG. 3 is a side perspective view of a floor of a vehicle including a plurality of seating assemblies and a track assembly.

Referring to FIGS. 1-3, a vehicle seating assembly 10 may include various features for providing movability of the vehicle seating assembly 10. The vehicle seating assembly 10 may include a track assembly 14 for translating the vehicle seating assembly 10 fore and aft within the vehicle 18. The track assembly 14 may be a long track assembly 14 or a short track assembly 14 for full or partial movement of the seating assembly 10 within the vehicle 18, respectively. The seating assembly 10 may further include a platform 22 extending between tracks 26 of the track assembly 14. The platform 22 and the track assembly 14 may be integrated into the vehicle underbody frame 30 to provide structural stiffness and side-impact performance. The platform 22 may include cross members 34 configured to allow the structural stiffness needed for side-impact performance to move with the seating assembly 10, allowing the seating assembly 10 to be moved into various positions while maintaining structural support. Further, the platform 22 may also include a universal attachment system 38 to allow various seating assemblies to couple with the platform 22 including, for example, rotating seating assemblies. Also, a seating assembly 10 may have a base member 42 that may be a module that may be received by the universal attachment system 38 of the platform 22. The platform 22 may include extendable, or widening, cross members 34 that may be adjustable to configure the platform 22 to receive base members 42 of various widths that may correspond to seating assemblies 10 of various widths.

Referring now to FIGS. 1 and 2, a vehicle underbody frame 30 is shown having a plurality of seating assemblies 10. The vehicle underbody frame 30 may include a floor panel 46 configured to support the plurality of seating assemblies 10. The vehicle underbody frame 30 may further include a front area 50 and a rear area 54. One or more of the plurality of seating assemblies 10 may be configured as the movable vehicle seating assembly 10. It is contemplated that the vehicle 18 may be any type of vehicle, for example a car, a truck, a van, or other vehicle. It is also contemplated that the vehicle 18 may be an autonomous vehicle. It is also contemplated that the concept set forth in this disclosure may be utilized in the front area 50 of the vehicle 18, as well as the rear area 54 of the vehicle 18, depending on the configuration of the vehicle 18.

A portion of the plurality of seating assemblies 10 of FIGS. 1 and 2 is shown positioned within the front area 50 of the vehicle 18 with one or more of the plurality of seating assemblies 10 being configured as a movable vehicle seating assembly 10. Another portion of the plurality of seating assemblies 10 may be positioned elsewhere within the vehicle 18. The plurality of seating assemblies 10 may be operably coupled to the floor panel 46 of the vehicle 18 by track assemblies 14. Any one of the plurality of seating assemblies 10 may be configured as a movable vehicle seating assembly 10. The vehicle seating assemblies 10 may be translatable along the respective track assembly 14 between a first position of the seating assembly 10 (FIG. 1) and a second position of the seating assembly 10 (FIG. 2). Additionally, the vehicle seating assemblies 10 may be rotatable relative to the platform 22 using a swivel assembly (not shown). Where the vehicle seating assemblies 10 are rotatable, the vehicle seating assemblies 10 may further be movable between a forward facing position in the vehicle 18 (FIG. 1) and a rearward facing position in the vehicle 18 (FIG. 2).

Referring now to FIG. 3, the seating assembly 10 may include a seat 60 and a seatback 64. The seat 60 may be disposed above the base member 42. A linkage assembly 58 or seat frame 116 for securing the seat 60 to the base member 42 may be disposed between the seat 60 and the base member 42. The seat 60 may include bolsters 62 that may be disposed on opposing sides of the seat 60. The seatback 64 may be pivotally coupled to the seat 60. A headrest 68 may be coupled to the seatback 64. The occupant 12 may be restrained by a seatbelt 70. According to various examples, the seating assembly 10 may include covers 72 positioned on either side of the seating assembly 10.

A floor cover 76 may be positioned above and parallel to the floor panel 46 and may be configured to conceal the track assembly 14. The floor cover 76 may define a plurality of slots 80. The plurality of slots 80 may be defined over the tracks 26 of the track assembly 14, such that the platform 22 may extend at least partially through the plurality of slots 80 to couple to the track assembly 14. Each of the slots 80 may be defined to have a length selected to allow movement of the seating assembly 10 between the first position of the seating assembly 10 (FIG. 1) and the second position of the seating assembly 10 (FIG. 2).

The floor cover 76 may further conceal a cutout 84 of the floor panel 46. The cutout 84 may be configured to house the track assembly 14. The cutout 84 may include front and rear walls 88, 92 and sidewalls 96, 100. The sidewalls 96, 100 may be spaced apart and may frame a void 104 of the cutout 84. The track assembly 14 may be positioned within the void 104. In various examples, the platform 22 may at least partially be positioned within the void 104 and the track assembly 14. The track assembly 14 may include guides 108 positioned on first and second sides of the seating assembly 10 and operably coupled with the cutout 84. The guides 108 may be positioned in pairs. Each guide 108 may be operably coupled with one of the sidewalls 96, 100, such that the track assembly 14 is recessed within the cutout 84, as the seating assembly 10 is translated between the first position of the seating assembly 10 (FIG. 1) and the second position of the seating assembly 10 (FIG. 2).

Referring to FIGS. 1-19, a vehicle seating assembly 10 includes a housing assembly 114 coupled to a seat frame 116. The vehicle seating assembly 10 includes a transverse member 118. A cushion pan 120 extends between the transverse member 118 and a cross bar 122. A cushion nose 124 extends between the transverse member 118 and a front portion 126 of the housing assembly 114. A gas-generating device 262 is disposed in the seat 60 and is deployable in response to a sudden vehicle deceleration represented by a force F1 in FIGS. 3 and 5 to exert a force (F4, F5, or F6) on the cushion nose 124 to rotate the cushion nose 124 about the transverse member 118 from a first position to a second position. In various examples, the first position may be a design position A, and the second position may be a fully deployed position B.

Figure 4:
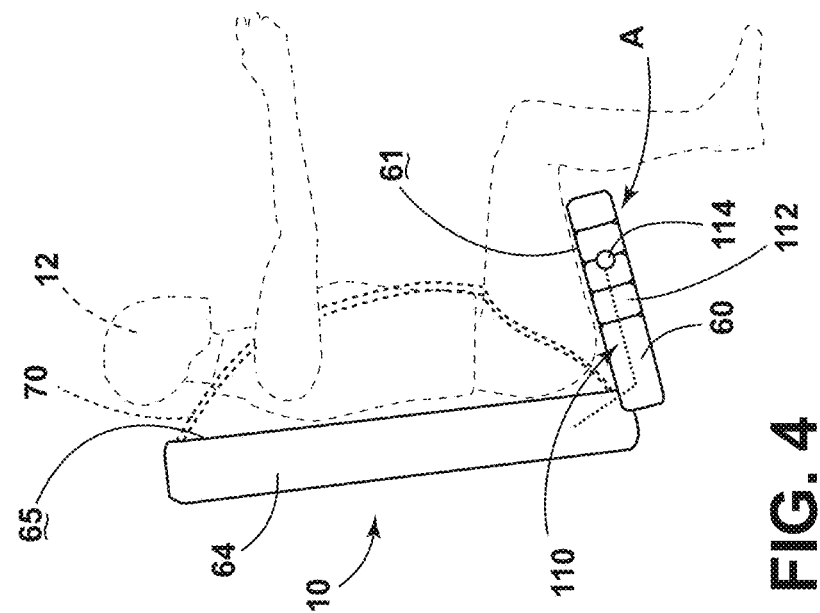
FIG. 4 is side schematic view of a seating assembly with a cushion support assembly in a design position.

Referring to FIG. 4, a schematic side view is shown of an occupant in a seating assembly 10. The seating assembly 10 may include a seat 60 and a seatback 64. A seat surface 61 is shown on the seat 60. A seatback surface 65 is shown on the seatback 64. An occupant 12 is shown seated in the seating assembly 10. A seatbelt 70 may be disposed over the occupant 12. The cushion support assembly 110 is shown within the seat cushion 112. The seat cushion 112 may include foam and trim. The seat cushion 112 may be described as a foam and trim carrier. A cross section of the front portion 126 of the housing assembly 114 is shown as a circle. The cushion support assembly 110 is shown in the design position A.

Figure 5:
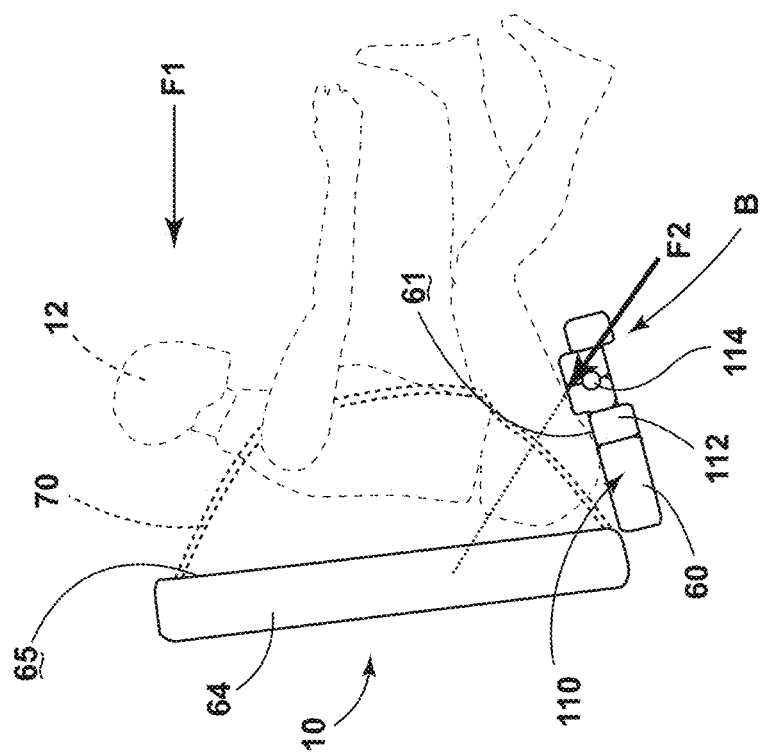
FIG. 5 is a side schematic view of a seating assembly with a cushion support assembly in a fully deployed position.

Referring to FIG. 5, a schematic side view is shown of an occupant 12 in the seating assembly 10. A seatbelt 70 may be disposed over the occupant 12. The cushion support assembly 110 is shown within the seat cushion 112. The cushion support assembly 110 is shown in the fully deployed position B. Upon a sudden deceleration of vehicle 18 (as represented by a force F1 in FIGS. 3 and 5), the cushion nose 124 of the cushion support assembly 110 may be designed to provide a force F2 to the hips and legs of the seated occupant 12 to regulate, in combination with the seatbelt 70, the movement of the occupant 12 away from the seatback 64 and along a seat surface 61 of the seat 60. The seat cushion 112 is shown with the portion of the seat cushion 112 proximate the circular cross section of the housing assembly 114 displaced upward to represent the cushion nose 124 in the fully deployed position B.

Figure 6:
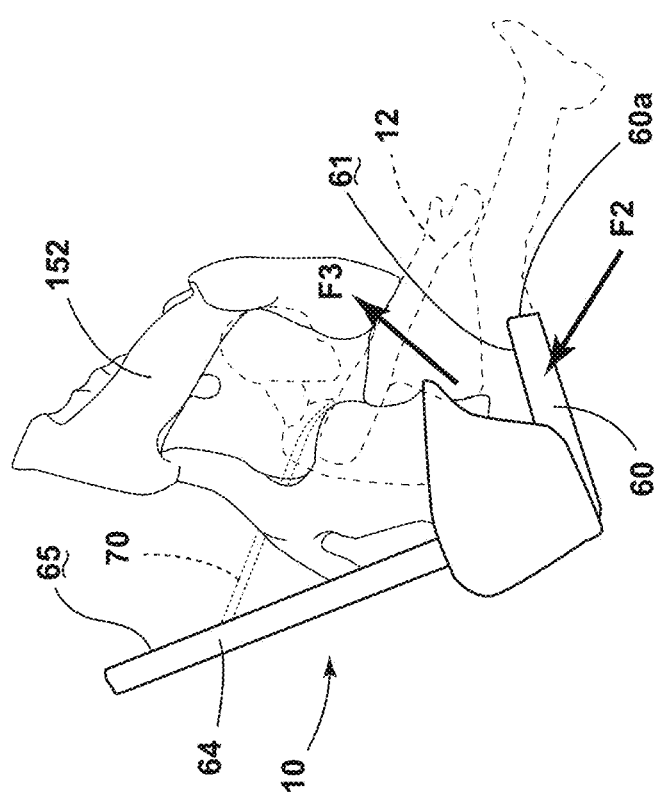
FIG. 6 is a side schematic view of a seating assembly with a cushion support assembly in a fully deployed position and an airbag in a deployed position.

Referring to FIG. 6, a schematic side view is shown of an occupant 12 in a seating assembly 10. An occupant 12 is shown traveling into an airbag 152. The airbag 152 may be similar to the airbags disclosed in U.S. patent application Ser. No. 16/370,519, entitled Seat Assembly with Full Seatback Airbag, filed Mar. 29, 2019, now U.S. Pat. No. 10,821,929, issued Nov. 3, 2020, and U.S. patent application Ser. No. 16/370,617, entitled Seat Assembly with Full Seatback Airbag, filed Mar. 29, 2019, both of which are hereby incorporated herein by reference in their entireties. In the example shown, a sudden deceleration of the vehicle 18 has occurred (as represented by a force F1 in FIGS. 3 and 5).

With reference to FIGS. 4-6, in response to the sudden deceleration represented by force F1 in FIGS. 3 and 5, the cushion nose 124 of the cushion support assembly 110 may move from a design position A to a fully deployed position B to exert force F2 on the hips and legs of the occupant 12. The force F2 exerted by the cushion nose 124 in the fully deployed position B may restrain, along with the seatbelt 70 and the airbag 152, the occupant 12 from moving along the seat surface 61 and away from the seatback 64. In response to forces F1 and F2, the occupant 12 may also move forward and exert a force F3 on the airbag 152. The airbag 152 may deploy to restrain the movement of the occupant 12 in the direction away from the seatback 64.

With continued reference to FIGS. 4-6, it will be appreciated that the cushion support assembly 110 and the housing assembly 114 may be used with a variety of vehicle restraints (for example, seatbelt 70, airbag 152, and other restraints) to limit movement of an occupant 12 along a seat surface 61 during a sudden deceleration of the vehicle 18 (shown by arrow F1 in FIGS. 3 and 5). For example, the cushion support assembly 110 and the housing assembly 114 may be installed in a seating assembly 10 equipped with only a seatbelt 70. The cushion support assembly 110 and the housing assembly 114 may be installed in a seating assembly 10 equipped with a seatbelt 70 and an airbag 152. The cushion support assembly 110 and the housing assembly 114 may be installed in a seating assembly 10 equipped with only an airbag 152. The cushion support assembly 110 and the housing assembly 114 may also be designed for use by an occupant 12 who does not use a seatbelt 70 that is provided in a seating assembly 10, wherein the seating assembly 10 is equipped with an airbag 152. It is contemplated that in addition to or instead of a seatbelt 70 and/or an airbag 152, another restraint may be used to minimize the likelihood of an occupant 12 moving along the seat surface 61 and away from the seatback 64 during a sudden vehicle 18 deceleration represented by a force F1 in FIGS. 3 and 5. It is contemplated that the cushion support assembly 110 and the housing assembly 114 may be used with a restraint that minimizes the likelihood of an occupant 12 moving away from a seat surface 61 and a seatback surface 65 in the event of a sudden deceleration of a vehicle 18. As such, the cushion support assembly 110 and the housing assembly 114 may be utilized in combination with other occupant restraints to limit the movement of an occupant 12 during a sudden deceleration of a vehicle 18 (represented by F1 in FIGS. 3 and 5).

With reference again to FIGS. 4-6, the gas-generating device 262 (for example, a pyrotechnic device 128) may activate to cause the cushion nose 124 to rotate upward and to decelerate the occupant 12 and direct the occupant 12 in an upward trajectory (as represented by the arrow showing force F3) toward an airbag 152 that may deploy from the seatback 64 over the head of an occupant 12. In one example, the cushion nose 124 may be a composite material. The cushion nose 124 may move from the design position A to the fully deployed position B during a vehicle 18 deceleration depicted by arrow F1 in FIGS. 3 and 5. The movement of the cushion nose 124 from the design position A to the fully deployed position B may cause the trim and the foam of the seat 60, including bolsters 62 (see FIG. 3) on the seat cushion 112 and first and second bolsters 130, 131 on the cushion nose 124 (see FIGS. 9 and 10), to act as a comfortable and anthropomorphically-correct way to restrain the hips and legs of an occupant 12 and to allow for controlled deceleration of an occupant 12 after a sudden vehicle deceleration represented by force F1 in FIGS. 3 and 5. In various examples, the seat cushion 112 may include a foam and trim design that may allow the bolsters 62 on the front portion 60a of the seat 60 to articulate upward and to catch and decelerate the hips and legs of the occupant 12 during a sudden vehicle deceleration represented by F1 in FIGS. 3 and 5.

Generally, the cushion support assembly 110 may be designed to have at least first and second angles $\alpha 1$, $\alpha 2$ of the cushion nose 124 that will limit movement of the H-point (hip point) of the occupant 12. During a sudden deceleration of a vehicle (represented by F1 in FIGS. 3 and 5), it may be desirable to maintain the H-point of a seated occupant 12. The H-point of a seated occupant may be set at a predetermined location relative to a vehicle seating assembly. When designing vehicle seating assemblies, design parameters may require that the H-point of a mannequin be aligned with the predetermined H-point for a particular vehicle seating assembly in a vehicle. The H-point may position the head of an occupant at an appropriate position relative to the headrest on the vehicle seating assembly and relative to the roof of the vehicle. The H-point may also position the hips of an occupant at an appropriate position relating to a seatbelt or other restraint. Accordingly, the H-point may be an important design parameter of vehicle seating assembly 10.

Referring to FIGS. 7-8, a vehicle seating assembly 10 may include a seat 60 and a seatback 64. The seating assembly 10 may be disposed above a base member 42. The base member 42 may be mounted to a universal attachment system 38 coupled to the track assembly 14. (FIG. 3.) The seat may include a housing assembly 114 and a cushion support assembly 110. The housing assembly 114 may include a u-shaped member 132. The front portion 126 of the u-shaped member 132 of the housing assembly 114 and the first elongated portion 136 of the u-shaped member 132 of the housing assembly 114 are shown in FIGS. 7-8. The housing assembly 114 may be coupled to the seat frame 116 with first and second brackets 140, 142 (FIGS. 9, 9A). The cushion support assembly 110 may include a cushion pan 120, a cushion nose 124, and a transverse member 118 disposed between the cushion pan 120 and the cushion nose 124. The transverse member 118 may be an elongated tube.

The transverse member 118 may be integral with the cushion nose 124. The cushion nose 124 may be rotatably coupled to the cushion pan 120. The cushion nose 124 may rotate about an axis 144 defined by the transverse member 118 between a design positon A (FIG. 7) and a fully deployed position B (FIG. 8) in the direction shown by arrow I. In one example, the cushion nose 124 may rotate about the axis 144 from a first angle $\alpha 1$ in the range of approximately $-30$ degrees to approximately 30 degrees and include approximately 15 degrees (FIG. 7) to a second angle $\alpha 2$ in the range of approximately 20 degrees to approximately 60 degrees and include approximately 30 degrees (FIG. 8). The angle $\alpha$ may be measured from a line substantially parallel to a vehicle floor. The cushion nose 124 may be disposed at a first height H1 from a line substantially parallel to a vehicle floor in the design position A. The cushion nose 124 may be disposed at a second height H2 from a line substantially parallel to a vehicle floor in the fully deployed position B. The second height H2 may be greater than the first height H1.

With continuing reference to FIGS. 7 and 8, a pre-tensioner 148 may be disposed below the cushion nose 124. The pre-tensioner 148 may activate to rotate the cushion nose 124 from the design position A to the fully deployed position B in the direction shown by arrow I in response to a sudden vehicle deceleration represented by force F1 in FIGS. 3 and 5. The pre-tensioner 148 may include a gas-generating device 262. The gas-generating device 262 may include a pyrotechnic device 128. The pyrotechnic device 128 may be coupled to the housing assembly 114 and/or the cushion support assembly 110. The gas-generating device 262 may include a pyrotechnic device 128 configured to ignite a substance in order to create a phase change from a solid or liquid to a gas in order to increase pressure within a receptacle that the pyrotechnic device 128 may be housed in. The gas-generating device 262 may generally include a material such as, but not limited to, a binary powder, a chemical oxygen generator, a smokeless powder, various propellants, high test peroxide, and/or other such materials capable of phase change or expansion.

Referring again to FIGS. 7-8, the transverse member 118 of the cushion support assembly 110 may include an extension tab 150. The extension tab 150 may be a flange that extends along all or a portion of the transverse member 118. The extension tab 150 may receive a force F4 to move the cushion nose 124 from a design position A to a fully deployed position B. A connection assembly 154 may be disposed between the extension tab 150 and the pre-tensioner 148. In the example shown, the connection assembly 154 includes a cable assembly 156. The cable assembly 156 may include an inner cable positioned within an outer cable or sheath. A first end of the inner cable may be attached to an area of the housing assembly 114 that houses the pre-tensioner 148. The second end of the inner cable may be attached to the extension tab 150. The outer cable may include bushings for mounting the outer cable to the cushion nose 124 proximate the extension tab 150 and the housing assembly 114. Upon activation of the pre-tensioner 148 in response to a sudden vehicle deceleration represented by force F1 in FIGS. 3 and 5, a force may be exerted on the first end of the inner cable to cause the second end of the inner cable to exert a tensile force F4 on the extension tab 150 to move the cushion nose 124 from the design position A to the fully deployed position B. In the fully deployed position B, the position of the cushion nose 124 may prevent an occupant 12 from sliding forward along the seat surface 61 during a sudden vehicle deceleration represented by force F1 in FIGS. 3 and 5.

With continuing reference to FIGS. 7 and 8, the seating assembly 10 may include other features. A rotatable linkage assembly 164 may be disposed between the seat 60 and the seatback 64. The seatback 64 may be rotatable about the rotatable linkage assembly 164. The cushion pan 120 may be coupled to a cross bar 122 of the seat 60. In one example, the cushion pan 120 may be welded to the cross bar 122 of the seat 60. The seating assembly 10 may be designed so that the seat 60 may pivot with the cross bar 122 between the substantially horizontal position shown in FIGS. 7 and 8 and a substantially vertical position (not shown). The substantially vertical position of the seat 60 may be referred to as a stadium position of the seat 60. It is contemplated that the seat 60 in the substantially vertical or stadium position may be conveniently rotatable relative to the platform 22 (see FIG. 3) using a swivel assembly (not shown).

Figure 10:
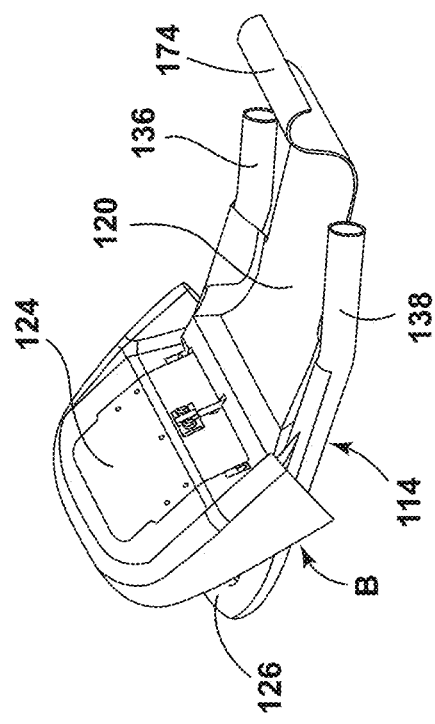
FIG. 10 is a side perspective view of a housing assembly and a cushion support assembly of FIG. 9 in a fully deployed position, according to an example
Figure 11:
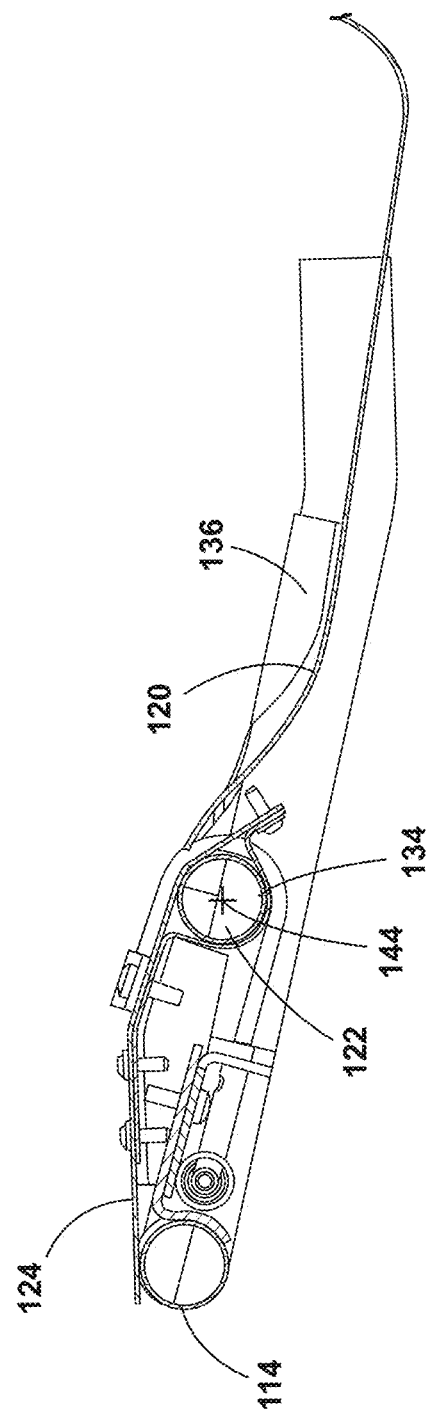
FIG. 11 is a cross-sectional view of a housing assembly and a cushion support assembly in the design position taken along line XI-XI of FIG. 9.

Referring now to FIGS. 9-11, additional views of the housing assembly 114 and the cushion support assembly 110 shown in FIGS. 7 and 8 are shown. With reference to FIG. 9, the cushion support assembly 110 is shown in the design position A. The cushion pan 120 may include a substantially flat area disposed in the center portion of the cushion pan 120. The cushion pan 120 may include a lip 174 disposed at the rear of the cushion pan 120. The lip 174 may be curved so that the lip 174 may be mounted on the cross bar 122. The lip 174 may be fixed (for example, welded) to the cross bar 122. As such, when the cross bar 122 is rotated to move the seat 60 from the substantially horizontal position to the substantially vertical position, then the cushion support assembly 110 and the housing assembly 114 may rotate with the cross bar 122. The housing assembly 114 may include a u-shaped member 132 defined by a first elongated portion 136, a second elongated portion 138, and a front portion 126 that may connect the first elongated portion 136 and the second elongated portion 138.

Referring to FIGS. 9-9A, first and second brackets 140, 142 may couple the housing assembly 114 to a seat frame 116. In the example shown in FIG. 9, the first and second brackets 140, 142 may be stamped metal. The first and second brackets 140, 142 may be secured to the respective first and second elongated portions 136, 138 of the u-shaped member 132. In the example shown in FIG. 9, the first and second brackets 140, 142 may extend to the cross bar 122 disposed below the lip 174 of the cushion pan 120.

Referring to FIG. 9A, a front perspective view is shown of the occupant 12 disposed above the housing assembly 114. The housing assembly 114 is shown coupled to the seat frame 116 with opposing first and second brackets 140, 142. In the example shown, the first and second brackets 140, 142 may fixedly attach the housing assembly 114 to the seat frame 116. The seat frame 116 may be disposed in the base member 42. The base member 42 may be coupled to the tracks 26. As previously explained, the base member 42 may also be a module that may be received by the universal attachment system 38 of the platform 22. As such, the housing assembly 114 may be mounted to the seat frame 116, and a base member 42 may house the seat frame 116.

In the example shown in FIG. 9A, the first and second brackets 140, 142 may be a different shape and size than the first and second brackets 140, 142 shown in FIG. 9. In various examples, the first and second brackets 140, 142 shown in FIG. 9A may be disposed forward of the crossbar 122.

Referring again to FIG. 9, the cushion nose 124 may include first and second bolsters 130, 131 disposed on first and second sides of the cushion nose 124. The first and second bolsters 130, 131 may keep the legs of an occupant 12 together as the occupant 12 moves from the design position A (FIG. 9) to the fully deployed position B (FIG. 10). The first and second elongated portions 136, 138 disposed on either side of the housing assembly 114 may include first and second protrusions 176, 178. The first and second protrusions 176, 178 may fit within the first and second bolsters 130, 131 when the cushion nose 124 is in the design position A. The first and second protrusions 176, 178 may provide abutments for the first and second bolsters 130, 131 when the first and second bolsters 130, 131 are in the fully deployed position B. As such, the design of the first and second protrusions 176, 178 may limit the size of the second angle α2 when the cushion nose 124 is in the fully deployed position B.

With continued reference to FIG. 9, another example of a cable assembly 156 is shown. A first end of the cable assembly 156 may be mounted to a top surface of the cushion nose 124 and a flange or other member disposed on the housing assembly 114. The cable assembly 156 may wrap around the transverse member 118 and connect to a pre-tensioner 148. Activation of the pre-tensioner 148 may exert a tensile force F4 on the connection assembly 154 to rotate the cushion nose 124 from the design position A to the fully deployed position B. The pre-tensioner 148 may include a gas-generating device 262.

Referring now to FIG. 10, the cushion nose 124 is shown in the fully deployed position B. In the fully deployed position B, the inner portions 180 of the first and second bolsters 130, 131 disposed at the rear edges 182 of the first and second bolsters 130, 131 abut the first and second protrusions 176, 178.

Referring now to FIG. 11, a cross-sectional view of the housing assembly 114 and the cushion support assembly 110 of FIG. 9 is shown.

With reference to FIGS. 12-13, an example of a connection assembly 154 that exerts a compressive force F5 on the extension tab 150 is shown. The connection assembly 154 may be disposed beneath the cushion pan 120. The connection assembly 154 may include a cylinder 190 having a telescoping member 192. A pyrotechnic device 128 may be housed within the cylinder 190. The pyrotechnic device 128 may activate to cause the telescoping member 192 to extend and to exert a compressive force F5 on the extension tab 150 of the transverse member 118. The compressive force F5 exerted on the extension tab 150 of the transverse member 118 may cause the cushion nose 124 to rotate in the direction shown by arrow I around the axis 144 defined by the transverse member 118.

Figure 14:
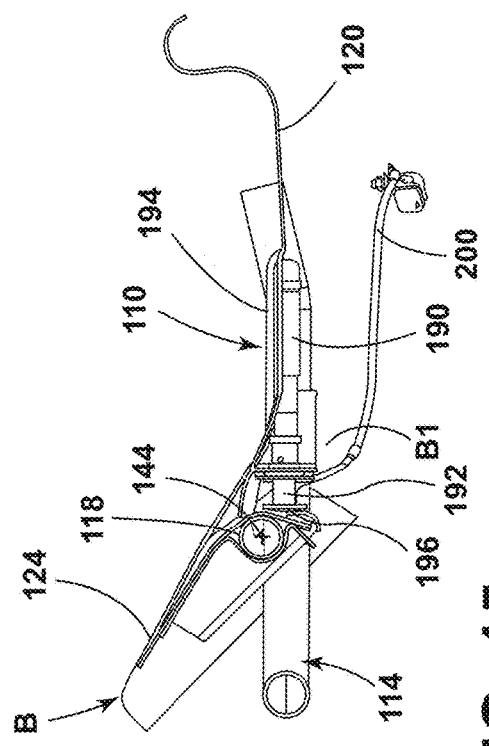
FIG. 14 is a cross-sectional side view of a housing assembly and a cushion support assembly in the design position, according to an example.
Figure 15:
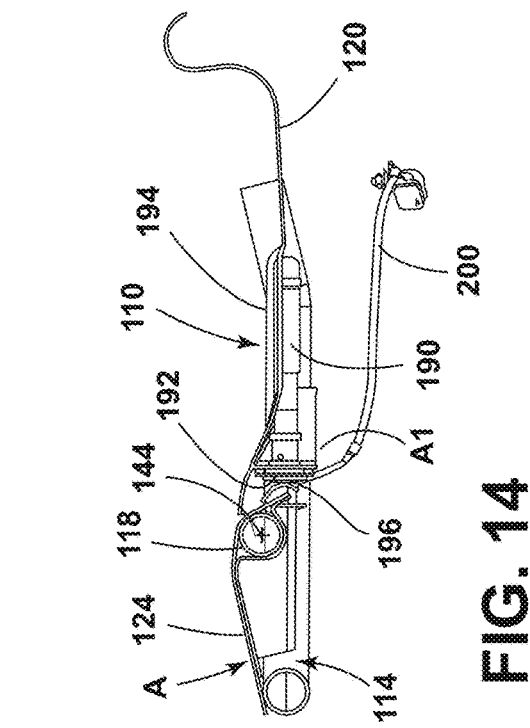
FIG. 15 is a cross-sectional side view of a housing assembly and a cushion support assembly of FIG. 14 in a fully deployed position, according to an example.
Figure 16:
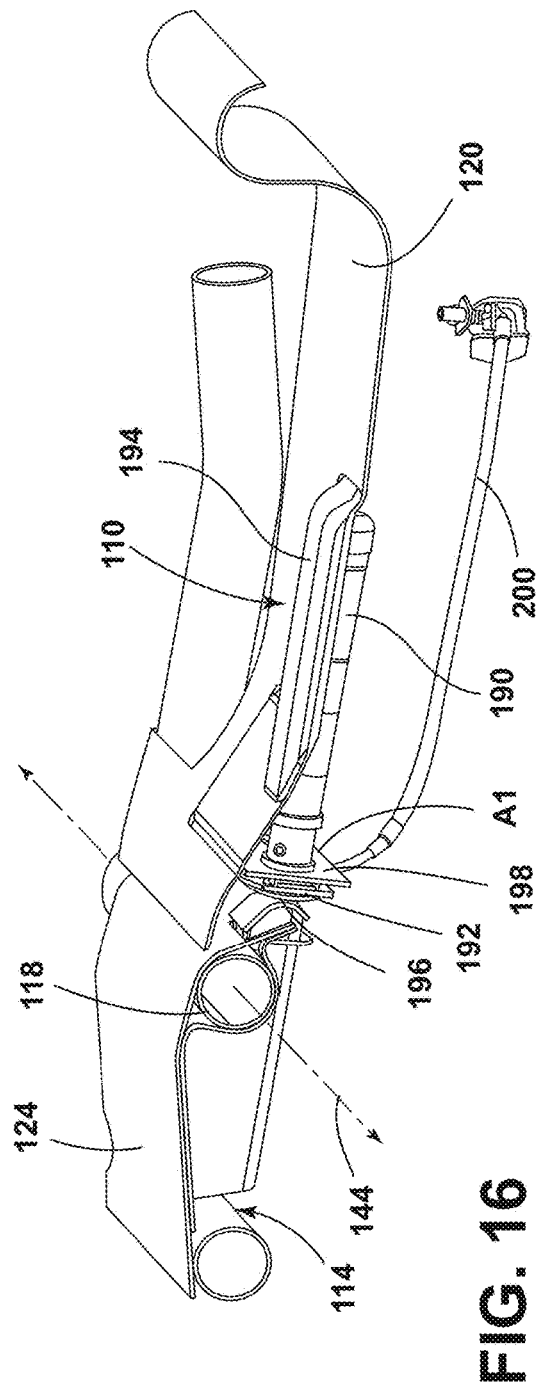
FIG. 16 is a side perspective view of a housing assembly and a cushion support assembly in a design position, according to an example.

With reference now to FIGS. 14-16, additional views of the housing assembly 114 and the cushion support assembly 110 of FIGS. 12-13 are shown. The cushion nose 124 shown in FIG. 14 is shown in a design position A. The cylinder 190 with the telescoping member 192 is shown disposed below the cushion pan 120. The cylinder 190 may be partially housed in a depression 194 in the cushion pan 120. The connection assembly 154 is shown with the telescoping member 192 in the stored position A1. The telescoping member 192 may abut a curved portion 196 of the cushion nose 124.

With reference to FIG. 15, the cushion nose 124 is shown in the fully deployed position B. The telescoping member 192 is shown in the extended position B1. The telescoping member 192 may exert a compressive force F5 on the curved portion 196 of the cushion nose 124 to rotate the cushion nose 124 in the direction shown by arrow I (see FIG. 12) from the design position A to the fully deployed position B.

With reference to FIG. 16, a portion of the cylinder 190 for housing the telescoping member 192 is shown secured in a flange 198 that may extend from the cushion pan 120. The telescoping member 192 is shown abutting the curved portion 196 of the cushion nose 124. The axis 144 about which the cushion nose 124 may rotate is shown extending through the transverse member 118. A wire harness 200 may extend from the cylinder 190. In various examples, the wire harness 200 may be used to activate the pyrotechnic device 128 that may lift the cushion nose 124.

Figure 17:
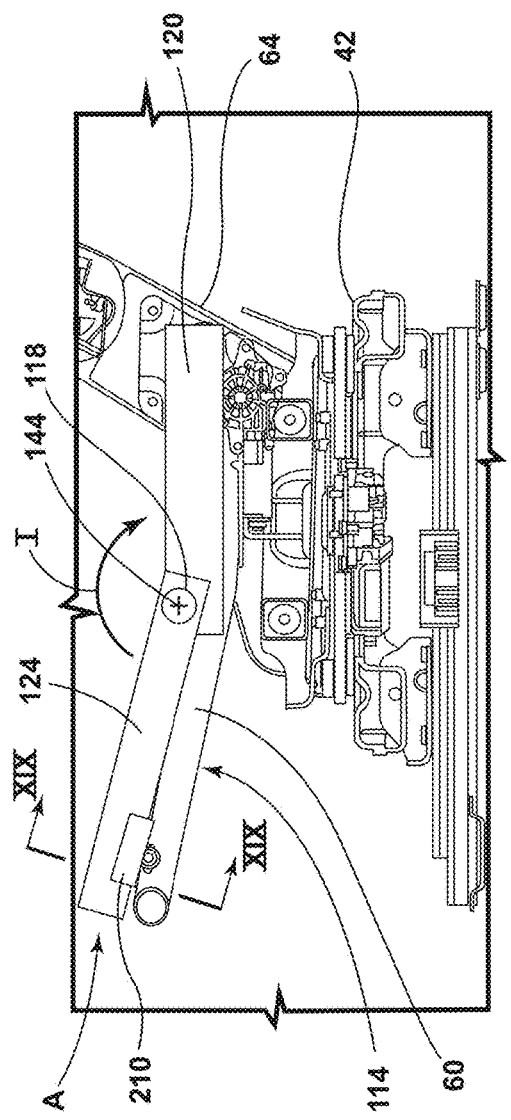
FIG. 17 is a side elevational view of a seating assembly with a cushion support assembly, a housing assembly, and a scissor assembly in a design position, according to an example.
Figure 18:
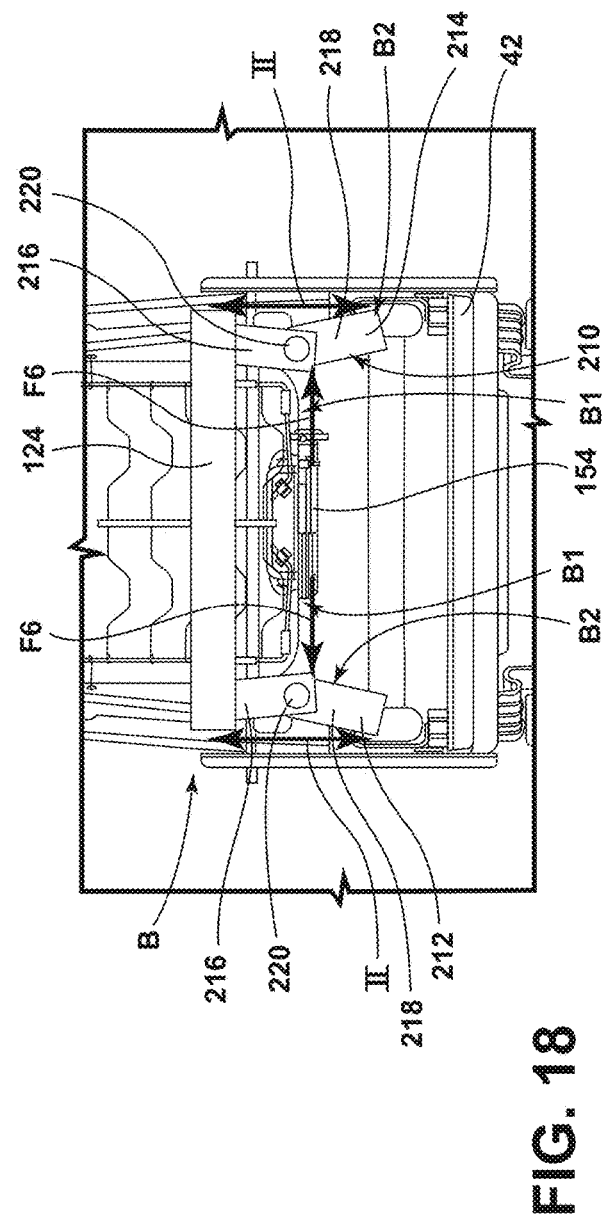
FIG. 18 is a front elevational view of the seating assembly with a cushion support assembly, a housing assembly, and a scissor assembly of FIG. 17 in a fully deployed position, according to an example.

Referring now to FIGS. 17-18, an example of a scissor lift assembly 210 for moving the cushion nose 124 from a design position A (FIG. 17) to a fully deployed position B (FIG. 18) is shown. With reference to FIG. 18, the scissor lift assembly 210 may include a first scissor lift 212, a second scissor lift 214, and a connection assembly 154 disposed between the first scissor lift 212 and the second scissor lift 214. The first and second scissor lifts 212, 214 may each move from a stored position A2 (FIG. 19) to an extended position B2 (FIG. 18). The first and second scissor lifts 212, 214 may each include a first link 216, a second link 218, and a pivot 220 disposed between the first link 216 and the second link 218. A pair of cylinders 190 with telescoping members 192 may be disposed between the pivots 220 of the first and second scissor lifts 212, 214. The telescoping members 192 may move from a stored position A1 to an extended position B1 to exert compressive forces F6 on the pivots 220 to move the first and second scissor lifts 212, 214 from a stored position A2 to an extended position B2. As the first and second scissor lifts 212, 214 move from a stored position A2 to an extended position B2, the cushion nose 124 may move from the design position A to the fully deployed position B in the direction shown by arrows II.

Figure 19:
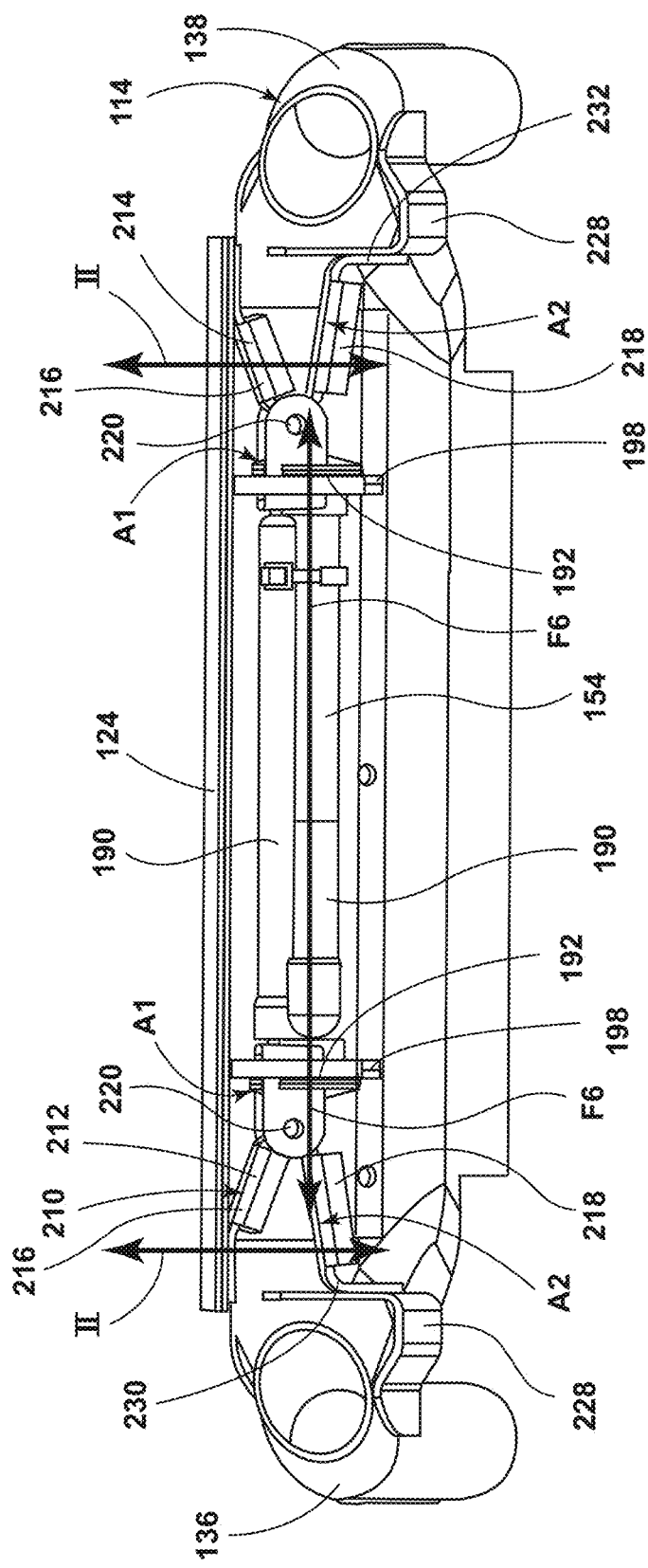
FIG. 19 is a cross-sectional view of the seating assembly with a cushion support assembly taken along line XVIV-XVIV of FIG. 17.

Referring to FIG. 19, a cross-sectional view of the scissor lift assembly 210, the housing assembly 114, and the cushion nose 124 is shown. A first metal bracket 230 may attach the second link 218 of the first scissor lift 212 to a bracket 228 extending from a housing assembly 114. A second metal bracket 232 may attach the second link 218 of the second scissor lift 214 to a bracket 228 extending from a housing assembly 114. The first and second metal brackets 230, 232 may bend in response to the pressure exerted by the telescoping members 192 as they move from a stored position A1 to an extended position B1. The bending of the first and second metal brackets 230, 232 may allow the first and second scissor lifts 212, 214 to move from the stored position A2 to the extended position B2.

With continued reference to FIG. 19, the connection assembly 154 may include two cylinders 190. A pyrotechnic device 128 may be disposed in each cylinder 190. Each cylinder 190 may be mounted to a flange 198 that may extend from the cushion pan 120, the housing assembly 114, or a similar structure. The two flanges 198 may be mounted to the cushion pan 120, the housing assembly 114, or a similar structure proximate the first scissor lift 212 and the second scissor lift 214. As the telescoping member 192 moves from a stored position A1 to an extended position B1, forces F6 may be exerted on the pivots 220 of the first and second scissor lifts 212, 214. Forces F6 may move the first and second scissor lifts 212, 214 from a stored position A2 to an extended position B2. In various examples, the two cylinders 190 may be a single unit with one or more pyrotechnic devices 128 that may actuate the telescoping members 192 or similar structures to exert compressive forces F6 on the pivots 220 to move the first and second scissor lifts 212, 214 from the stored position A2 to the extended position B2.

Figure 20:
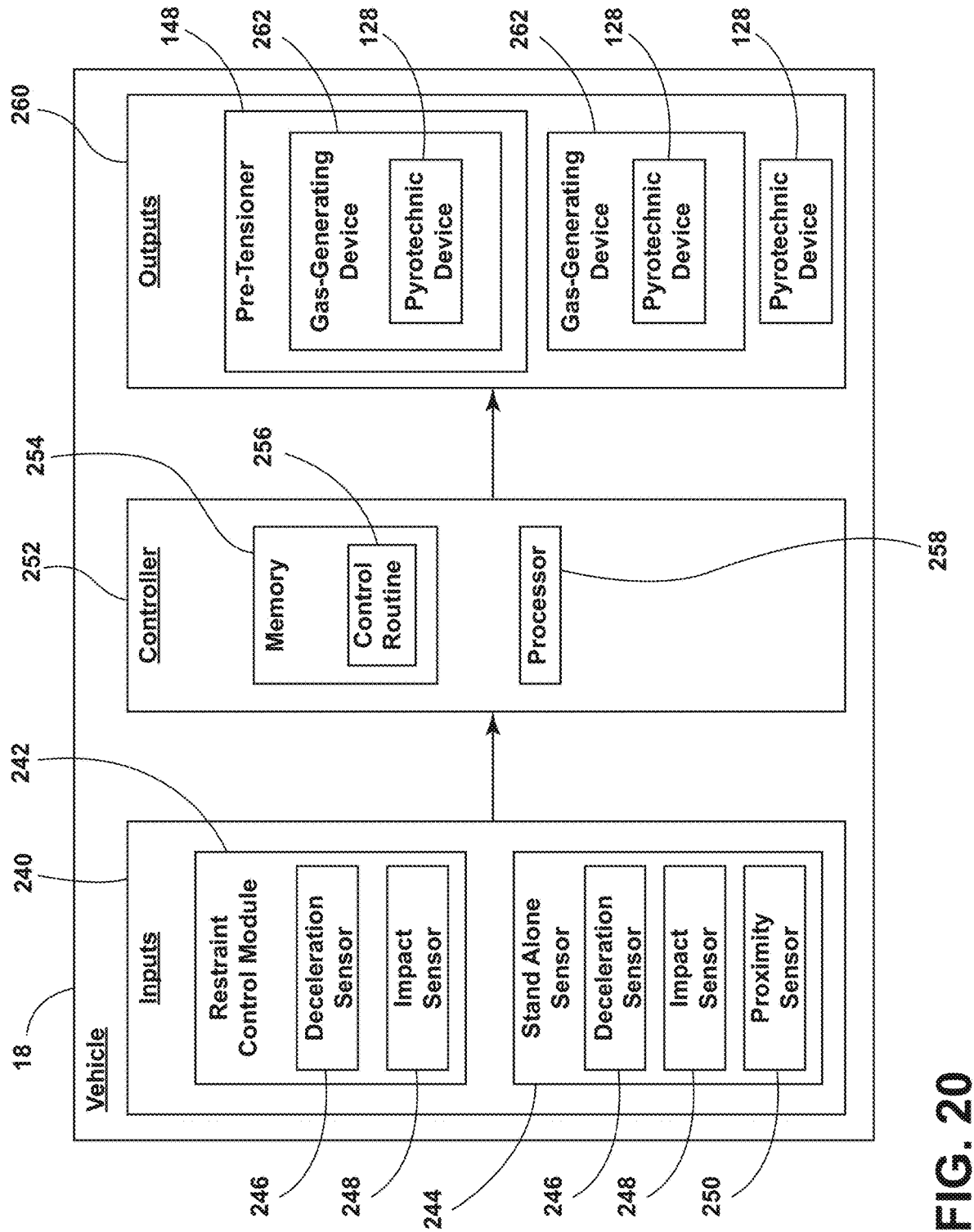
FIG. 20 is a block diagram of a vehicle.

Referring to FIG. 20, a block diagram of a vehicle 18 is shown. The vehicle 18 may include inputs 240. The inputs 240 may be from a restraint control module 242, a stand alone sensor 244, or another source (not shown). The restraint control module 242 may include inputs 240 from a deceleration sensor 246 and an impact sensor 248. The stand alone sensor 244 may include inputs 240 from a deceleration sensor 246, an impact sensor 248, and a proximity sensor 250. The inputs 240 may be delivered to a controller 252. The controller 252 may include a memory 254 and a processor 258. The memory 254 may include a control routine 256. The controller 252 may provide outputs 260. The outputs 260 may include a pre-tensioner 148. The pre-tensioner 148 may include a gas-generating device 262. The gas-generating device 262 may include a pyrotechnic device 128. The outputs 260 may also include a gas-generating device 262 that may be independent of a pre-tensioner 148. The gas-generating device 262 may include a pyrotechnic device 128. It is contemplated that other pyrotechnic devices 128 may be used in addition to gas-generating pyrotechnic devices 128 or instead of gas-generating pyrotechnic devices 128.

A variety of advantages may be gained from use of the present disclosure. A pyrotechnic device 128 may be integrated in a seat 60. The pyrotechnic device 128 may deploy the cushion nose 124 from a design position A to a fully deployed position B to decelerate an occupant 12 in response to a force from a sudden vehicle 18 deceleration (for example, force F1 in FIGS. 3 and 5). The pyrotechnic device 128 may be disposed below the cushion support assembly 110 so that the cushion support assembly 110 may shield the pyrotechnic device 128 from day-to-day use loads and abuse loads (for example, knee loads or heavy cargo loads). The cushion support assembly 110 and the housing assembly 114 may provide a cushion pan 120, a comfort support, areas for trim and foam tie-downs and nesting, and a cushion nose 124 for deceleration of an occupant 12 in response to a force form a sudden vehicle 18 deceleration (for example, force F1 in FIGS. 3 and 5). As such, the cushion support assembly 110 and the housing assembly 114 may have a variety of advantages.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle seating assembly comprising:
    a housing assembly coupled to a seat frame and including:
        a transverse member;
        a cushion pan extending between the transverse member and a cross bar;
        a cushion nose extending between the transverse member and a front portion of the housing assembly; and
        a gas-generating device deployable in response to a sudden vehicle deceleration to exert a force on the cushion nose to rotate the cushion nose about an axis defined by the transverse member from a first position to a second position, wherein the first position includes a design position, wherein the second position includes a fully deployed position, wherein the cushion pan includes a lip for coupling the cushion pan to the cross bar, and wherein the housing assembly includes first and second elongated portions disposed on first and second sides of the cushion pan.

2. The vehicle seating assembly of claim 1, wherein the housing assembly includes a u-shaped member defined by the first and second elongated portions and the front portion of the housing assembly.

3. The vehicle seating assembly of claim 2, further comprising:
first and second brackets for securing the u-shaped member to the cross bar.

4. The vehicle seating assembly of claim 1, wherein the force comprises a compressive force exerted on the cushion nose to move the cushion nose from the design position to the fully deployed position.

5. The vehicle seating assembly of claim 4, wherein the gas-generating device is disposed below the cushion pan, and wherein the gas-generating device exerts the compressive force on the cushion nose to rotate the cushion nose about the axis defined by the transverse member.

6. The vehicle seating assembly of claim 5, wherein the gas-generating device is disposed in a cylinder having a telescoping member.

7. The vehicle seating assembly of claim 1, wherein the cushion nose is disposed at a first angle relative to the cushion pan in the design position, wherein the cushion nose is disposed at a second angle relative to the cushion pan in the fully deployed position, and wherein the first angle is less than the second angle.

8. A vehicle seating assembly comprising:
a housing assembly coupled to a seat frame and including:
a transverse member;
a cushion pan extending between the transverse member and a cross bar;
a cushion nose extending between the transverse member and a front portion of the housing assembly; and
a gas-generating device deployable in response to a sudden vehicle deceleration to exert a force on the cushion nose to rotate the cushion nose about an axis defined by the transverse member from a first position to a second position, wherein the first position includes a design position, wherein the second position includes a fully deployed position, and wherein the gas-generating device is disposed below the cushion nose and is operably coupled to a cable assembly having a first end secured to the housing assembly below the cushion nose and a second end secured to the cushion nose.

9. The vehicle seating assembly of claim 8, wherein the force is a tensile force.

10. A vehicle seating assembly comprising:
a housing assembly coupled to a seat frame and including:
a transverse member;
a cushion pan extending between the transverse member and a cross bar;
a cushion nose extending between the transverse member and a front portion of the housing assembly;
a gas-generating device deployable in response to a sudden vehicle deceleration to exert a force on the cushion nose to rotate the cushion nose about an axis defined by the transverse member from a first position to a second position, wherein the first position includes a design position, wherein the second position includes a fully deployed position, and wherein opposing first and second scissor lifts are disposed between the cushion nose and the housing assembly.

11. The vehicle seating assembly of claim 10, wherein a gas-generating device is disposed between the first and second scissor lifts, and wherein the first and second scissor lifts each move from a stored position to an extended position to move the cushion nose from the design position to the fully deployed position.

12. A vehicle seating assembly comprising:
a housing assembly coupled to a seat frame;
a cushion support assembly disposed in the housing assembly and having:
a cushion nose rotatably coupled to a cushion pan;
a cushion disposed above the cushion support assembly and providing a seat surface; and
a pyrotechnic device configured to receive a signal from a restraint control module and to activate in response to the signal to generate a force that rotates the cushion nose about an axis defined by a transverse member of the cushion support assembly from a design position to a fully deployed position, wherein the transverse member comprises an extension tab, wherein the pyrotechnic device is coupled to the extension tab, and wherein activation of the pyrotechnic device exerts a force on the extension tab to move the cushion nose from a design position to a fully deployed position.

13. The vehicle seating assembly of claim 12, wherein the cushion nose includes first and second bolsters.

14. The vehicle seating assembly of claim 13, wherein the housing assembly includes first and second protrusions disposed on first and second elongated portions of the housing assembly, and wherein, when the cushion nose is in the fully deployed position, the first and second protrusions engage the first and second bolsters of the cushion nose to limit movement of the cushion nose.

15. The vehicle seating assembly of claim 12, wherein a front edge of the cushion nose is disposed at a first height in the design position and a second height in the fully deployed position.

* * * * *